UNITED STATES PATENT OFFICE.

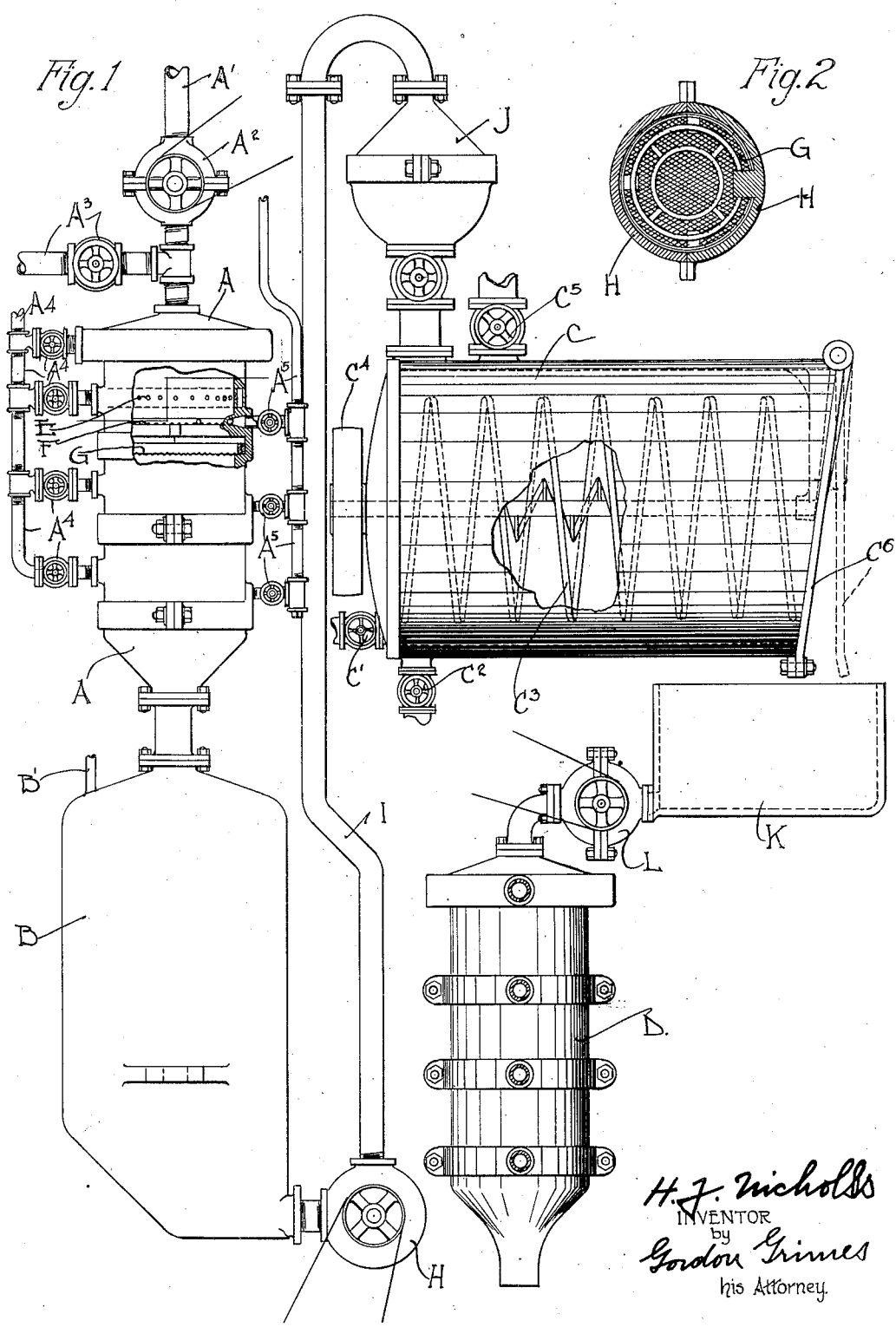

HARRY J. NICHOLLS, OF MINNEAPOLIS, MINNESOTA.

SOAP-MAKING APPARATUS.

1,339,126.     Specification of Letters Patent.     Patented May 4, 1920.

Application filed December 3, 1917, Serial No. 205,118. Renewed January 12, 1920. Serial No. 351,053.

*To all whom it may concern:*

Be it known that I, HARRY J. NICHOLLS, a citizen of the United States, residing at 2888 Irving avenue, south, in the city of Minneapolis, in the county of Hennepin and State of Minnesota, have invented new and useful Improvements in Soap-Making Apparatus, of which the following is a specification.

This invention relates to the manufacture of soap wherein a fat or oil and an alkali are used as the principal ingredients and where ozone or a similar bleaching agent is used to bleach, oxidize, deodorize or purify the soap. It has for its objects to provide a single mechanism which will combine in a proper manner the several ingredients of the soap in a continuous process thereby greatly decreasing the cost of the mechanism and the expense of its operation.

I attain these objects by the mechanism illustrated in the accompanying drawings, in which:—

Figure 1 is a plan view of the mechanism and Fig. 2 is a view of one of the screens used in the ozonator.

The principal elements of this apparatus are, an ozonator A, separating tank B, agitator C and ozonator D. Liquid fat is supplied to ozonator A through inlet $A^1$ and centrifugal pump $A^2$ at a predetermined rate, water may be admitted as desired through inlet $A^3$, steam may be similarly admitted through inlets $A^4$ and ozone may be similarly admitted through inlets $A^5$ to ozonator A.

As the liquid fat passes through ozonator A, it is moistened, heated, and subjected to the action of the ozone as desired. The fat is broken up and thoroughly mixed with the other materials by the steam and water and by the ozone. The steam is forced into the mixture through sprays E and the ozone through sprays F. After being forced by sprays E and F the fats, water and ozone are screened through screen G which is removably held in position by frame H. The further mixture and application of steam and ozone and the further screening of the composition is repeated twice in ozonator A.

As the product of ozonator A passes through separating tank B the air and steam vent off through vent $B^1$ in the top of tank B.

From tank B the liquid product is forced by pump H through tube I and through filter press J and into agitator C where, steam may be admitted through inlet $C^1$, and the product heated to the desired temperature by the use of the steam jacket about the agitator to which steam may be admitted through inlet $C^2$. Agitator C is provided with agitating blades $C^3$ and means $C^4$ for rotating the same. Inlet $C^5$ is adapted to admit the alkali simultaneously with the admission of the fat product from filter J. The fat product and alkali are then thoroughly mixed at the desired temperature in agitator A, after which gate $C^6$ is opened allowing the product to drain from agitator A into tank K from which the product is forced into ozonator D by pump L. In ozonator D the product of agitator C is subjected to the same treatment as the fat in ozonator A. Ozonator D is identical in construction with ozonator A. The product of ozonator D is a pure soap.

The apparatus now in common use provides for large settling tanks for the treating of the fats to remove impurities after the application of sulfuric acid or some other substance. Such apparatus is very expensive and requires a long time for the manufacture of the product and large and expensive housing facilities.

I claim:

1. A mechanism of the kind described comprising a tank, several screens in the tank adapted to divide the same into successive compartments, means at the top of the tank for forcing a liquid into and through the compartments of the tank, means for forcing a gas into each of the compartments and an outlet from the tank adapted to permit the escape from the tank of the liquid and gas forced therein.

2. A mechanism of the kind described comprising a tank, several screens in the tank adapted to divide the same into successive compartments, means at the top of the tank for forcing a liquid into and through the compartments of the tank, means for forcing a gas into each of the compartments, additional means for forcing a different gas into each of the compartments and an outlet from the tank adapted to permit the escape from the tank of the liquid and gas forced therein.

H. J. NICHOLLS,